Figure 1:
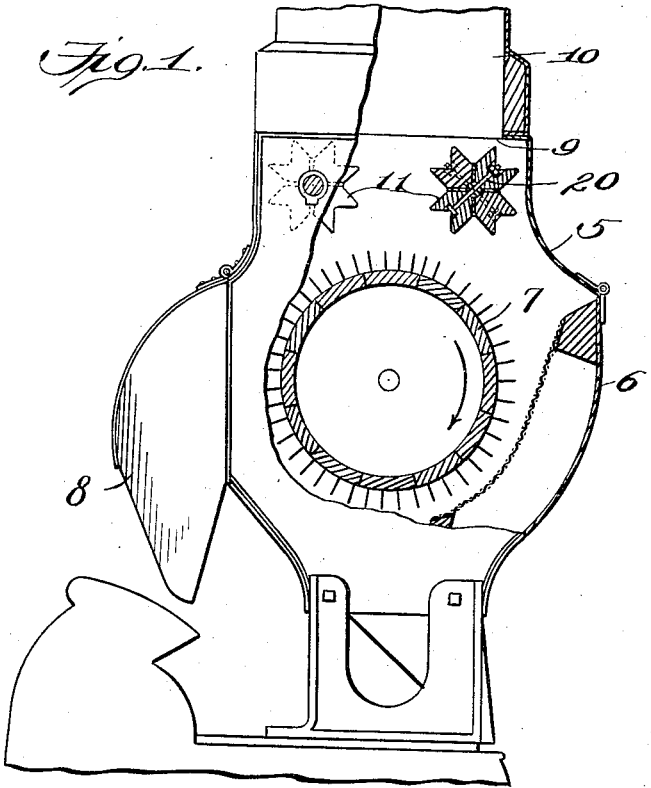

S. D. MURRAY.
COTTON FEEDER.
APPLICATION FILED MAR. 10, 1910.

1,017,446.

Patented Feb. 13, 1912.
2 SHEETS—SHEET 1.

Witnesses

Inventor
Stephen D. Murray
By James L. Norris
Atty.

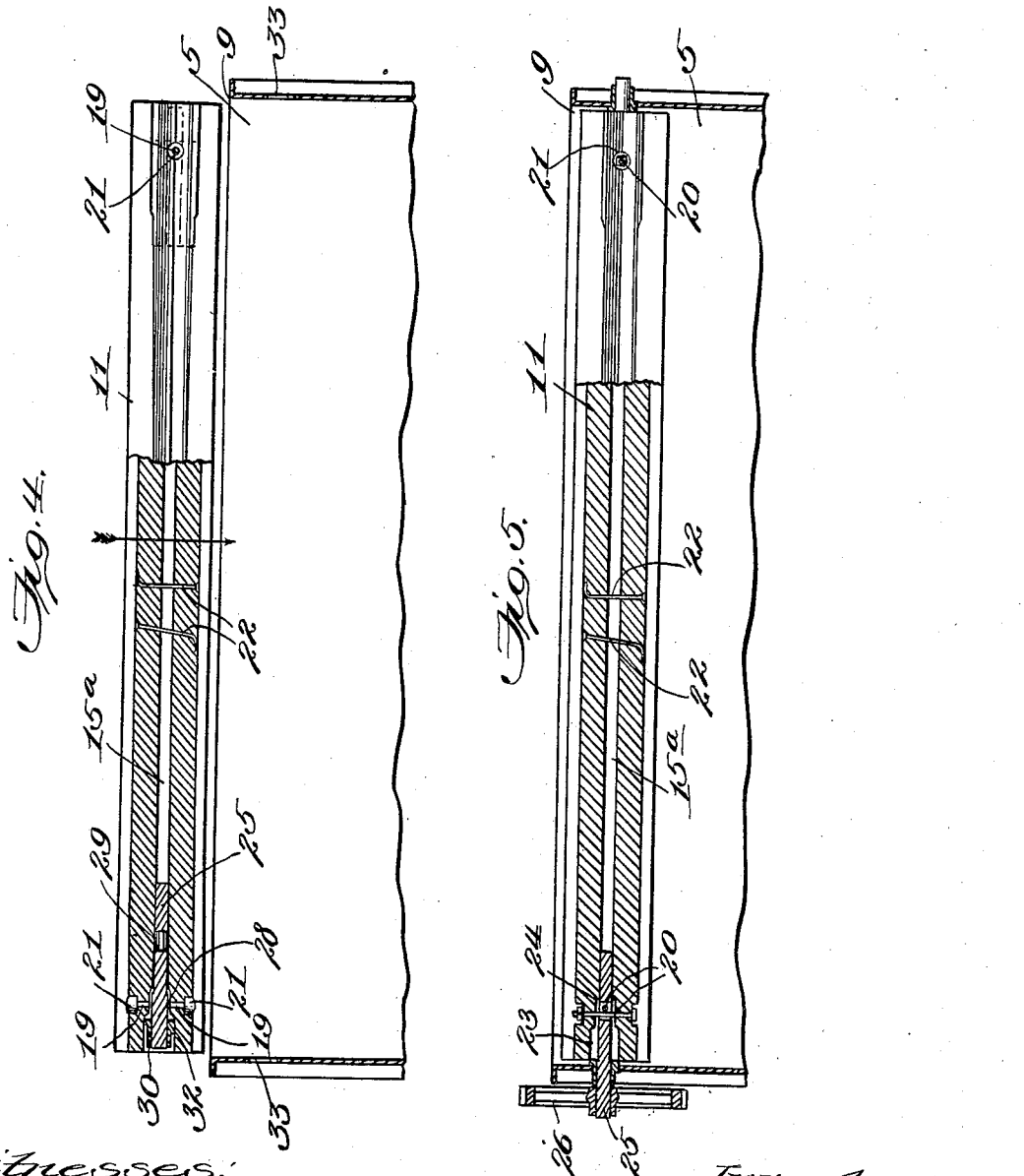

UNITED STATES PATENT OFFICE.

STEPHEN D. MURRAY, OF DALLAS, TEXAS.

COTTON-FEEDER.

1,017,446.  Specification of Letters Patent.  Patented Feb. 13, 1912.

Application filed March 10, 1910. Serial No. 548,365.

*To all whom it may concern:*

Be it known that I, STEPHEN D. MURRAY, a citizen of the United States, residing at Dallas, in the county of Dallas and State of Texas, have invented new and useful Improvements in Cotton-Feeders, of which the following is a specification.

This invention relates to cotton feeders and particularly to the feed rollers coöperating with a picker roller.

The primary object of the invention is to provide a novel form of feed roller to facilitate the placement and removal of the same relatively to the feeder casing without requiring an undue mutilation of the latter to receive the rollers, and whereby the feed rollers may be disposed in operative position from the interior of the casing with material advantages in the general organization of cotton feeders and effectiveness in the operation of the latter.

The invention consists in the preferred construction and arrangement of parts which will be more fully hereinafter specified.

Figure 2:
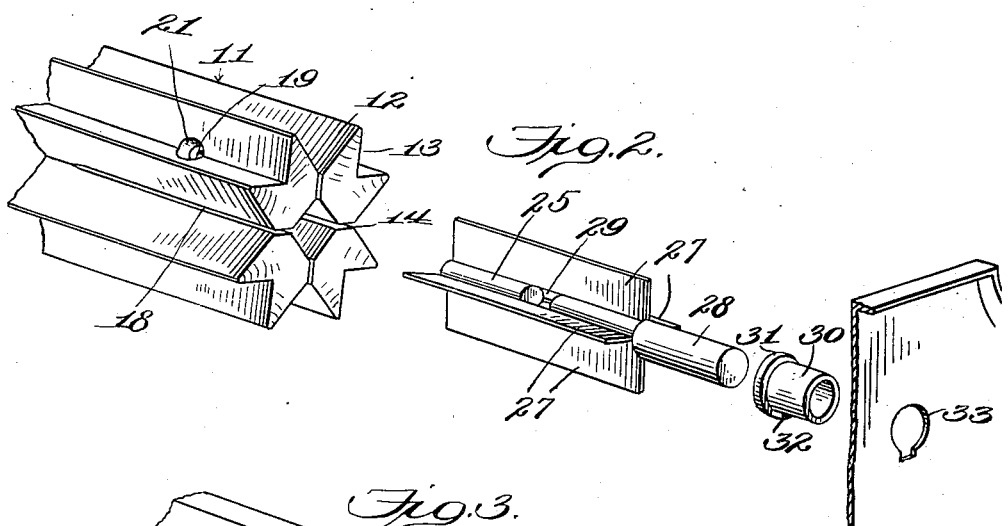
Figure 3:
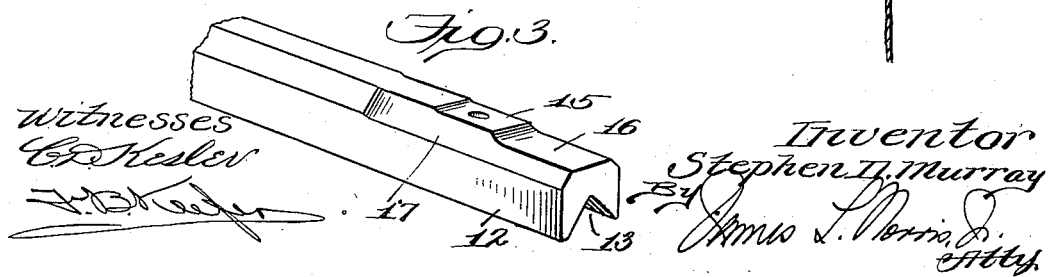

In the drawings one practical embodiment of the invention is disclosed, and therein:

Figure 1 is a sectional elevation of a cotton feeder embodying the features of the invention and showing a portion of the gin arranged in operative relation thereto. Fig. 2 is a perspective view showing a portion of one of the feed rollers, one of the adjustable spindles and bearing sleeves therefor and a part of one end of the casing. Fig. 3 is a detail perspective view of a portion of one of the feed roller members or slats. Fig. 4 is a longitudinal sectional view of a portion of the feeder casing showing the improved feed roller disposed thereabove in sectional elevation and reduced in longitudinal extent for insertion in the casing. Fig. 5 is a view similar to Fig. 4 showing the roller mounted in the casing.

The numeral 5 designates the feeder casing which is of the usual construction and provided with a rear opening having a hinged closure 6. The feeder also has a picker roller 7 disposed therein, an outlet 8 and an open top 9 over which the feeding chute or trunk 10 comprised in the feeder organization is arranged in the usual manner. Above the picker roller 7 is a pair of feed rollers 11 which embody the features of the invention. As the feed rollers 11 are duplicates it will suffice to specifically describe one of the same. Each roller comprises a series of members or slats 12 extending full length thereof and preferably consisting of wooden strips having their outer working edges angularly grooved as at 13 and their inner corners cut away as at 14 to facilitate the assemblage of the same in close relation so that they will have the form, in cross-section, of star-shaped cylinders with an opening 15 extending centrally therethrough. The slats 12 may be readily formed by suitable planing and grooving machinery in long lengths and cut as may be desired to produce a roller having the requisite length. Each member or slat 12 at opposite extremities has a shallow longitudinal recess 15$^a$ formed therein and continuing into a deeper longitudinal recess 16 extending fully outwardly to the adjacent end. The opposite cut-away corner portions 14 adjacent to the recesses 15 and 16 are deepened as at 17 and when the several slats are assembled these deepened portions form slits 18 between the slats which extend farther inwardly into the roller than the maximum inward extent of the recess 15$^a$. The opposing pairs of the slats 12 are also formed with bolt openings 19 extending transversely therethrough, the bolt openings of one pair being slightly nearer the end of each roller than the openings in the remaining pair of slats so as to permit the insertion of tie or clamping bolts 20 through the members or slats 12 in planes at right angles to each other, the openings 19 at their opposite extremities being formed with countersinks 21 to permit the heads and nutted extremities of the bolts 20 to be depressed into the bodies of the members or slats 12 and avoid objectionable projections of the said bolts. The openings 19 are formed through the centers of the outer grooved edges of the members or slats, as clearly shown by Figs. 1 and 2.

In the preliminary assemblage of the members or slats 12 the opposite extremities are loose so that they may be slightly sprung, and said members or slats are maintained in associated relation by headed fastenings 22 driven therethrough on opposite sides of the transverse center and terminally upset, as shown by Figs. 4 and 5. When the members or slats 12 are assembled the recesses 16 and 15$^a$ conjointly form outwardly opening end bores, the greater portions of these bores being enlarged as at 23 by the deeper recesses 16 and reduced as at 24 by the recesses 15ᵃ of less depth for a purpose which will now be explained. In the ends of each roller a spindle 25 is telescopically mounted, the one spindle being slightly longer than the other to receive a driving element, such as a sprocket wheel, pinion or other analogous device 26. Each spindle is provided with a plurality of radial blades or fins 27 arranged in planes at right angles to each other as regards the alined pairs of the same. In other words, the blades or fins 27 are so arranged that each pair is composed of two members at diametrically opposite points relatively to the spindle and the two pairs are arranged coincidently with the right angular diameters of the said spindles. The blades or fins 27 terminate at their outer ends at the inner terminal of an outer enlarged extremity 28 of the spindle, and said blades also have a length less than the maximum length of the slits 18 so that a flat implement may be inserted in the inner extremities of the said slits and engage the inner ends of the blades to force the spindle outwardly far enough to project the enlarged extremity 28 thereof. It will also be understood that the slits 18 have a length sufficient to compensate for the maximum inward movement of the spindle 25 and the blades 27 and including the outer enlarged extremity 28 of the spindle so that when the spindle is fully telescoped within the roller no part of the same will project beyond the end of the roller.
At an intermediate point each spindle 25 has an opening 29 therethrough of such length as to accommodate the insertion of the bolts 20 in planes at right angles to each other and through different portions of the opposed members or slats of each pair of the latter. The reduced portion 24 of each bore in the opposite ends of the roller is large enough to permit the free movement of the outer enlarged extremity 28 of the spindle thereinto and the outer enlarged portion 23 of the bore accommodates the housing of a bearing sleeve 30 in which the enlarged extremity 28 normally rotates. This bearing sleeve 30 has an inner rim or circumferential flange 31 and a lower key 32 preferably forming a part thereof. Each bearing sleeve 30 is projected through a key-hole slot or opening 33 formed in the casing end as illustrated by Fig. 2, and it will be seen that this key-hole slot or opening is wholly within the body of the casing end or does not have any edge outlet or entrance opening at the top edge of the feeder casing, for instance. The flange 31 on each bearing sleeve 30 serves as a means for insuring a regular outward movement of the sleeve with the spindle by contact with the outer end edges of the blades 27 and also prevents the said sleeve from being pushed outwardly through the opening 33 any greater distance than may be predetermined in accordance with the maximum projection of the enlarged extremity 28 of the spindle outwardly from the end of the roller.

The length of the roller when the spindles 25 and bearing sleeves 30 are telescoped in opposite ends thereof is less than the length of the casing 5 or the distance between the inner surfaces of the opposite ends of the latter, as clearly shown by Fig. 4. Under these conditions of dimensions the roller may be readily inserted within the casing and the bores in the opposite ends of the rollers are disposed opposite the openings 33 in the opposite ends of the casing 5, and when this registration has been obtained the spindles are moved outwardly from opposite ends of the rollers so as to cause the sleeves 30 to fully engage the said openings 33 and become locked against rotation through the medium of the keys 32. When the spindles have been thus projected they are locked against further outward and inward movements by inserting the bolts 20 through the opposite ends of the roller and the openings 29 through the spindles, and as the nuts on the bolts are tightened the opposite extremities of the members or slats 12 are regularly drawn inwardly so that the roller will have a practically uniform diameter throughout its length and the said members or slats 12 will be held with such rigidity relatively to each other as to render the roller effective for the purpose for which it has been devised. At any time each roller 11 may be removed from the casing 5 by withdrawing the bolts 20 and retracting the spindles within the opposite ends of the roller. The longer spindles to which the driving elements for the rollers are applied may be fixed in position after said spindles are projected through the end of the casing, and in removing the rollers from the casing it will be understood that the said driving elements are first detached from the spindles with which they coöperate. The blades 27 not only serve as a convenient means for manually projecting the spindles, but also as a means for insuring a positive rotation of the rollers by the operating mechanism therefor. These blades also reinforce the opposite extremities of the roller at points where torsional strain might otherwise result disadvantageously.

By the use of the form of feed rollers hereinbefore described, considerable economy results in cotton feeder organizations, both as to time in assembling and dissociating the parts, and in the cost of manufacture. A feed roller is also provided by the construction explained which is strong and durable and effective in operation.

What is claimed is:

1. A feed roller for a cotton feeder composed of a plurality of grooved slats having intermediate means for continuously holding the said slats in fixed associated relation, means for separably securing the opposite extremities of the slats, the said opposite extremities of the slats being releasable to permit the same to flare outwardly with relation to each other, and spindles telescopically mounted in the opposite extremities of the slats.

2. A feed roller for a cotton feeder composed of a plurality of grooved slats positively secured at their intermediate portions, means for separably securing the opposite extremities of the slats, and spindles telescopically mounted in the opposite extremities of the slats.

3. A feed roller for a cotton feeder composed of a plurality of grooved slats positively secured at their intermediate portions, means for separably securing the opposite extremities of the slats, and spindles telescopically mounted in the opposite extremities of the slats and provided with radial blades movably disposed between the slats.

4. A feed roller for a cotton feeder composed of a plurality of slats positively secured at their intermediate portions, means for separably securing the opposite extremities of the slats and disposed in planes at right angles to each other and engaging opposing slats, and spindles telescopically mounted in the opposite extremities of the slats and having openings therein for the said securing means.

5. A feed roller for a cotton feeder composed of a plurality of slats positively secured at their intermediate portions, means for separably securing the opposite extremities of the slats and disposed in planes at right angles to each other and engaging opposing slats, and spindles telescopically mounted in the opposite extremities of the slats and having openings therein for the said securing means and also provided with radial blades movably disposed between the slats.

In testimony whereof I have hereunto set my hand in presence of two subscribing witnesses.

S. D. MURRAY.

Witnesses:
BRUCE THOMAS,
R. H. NEVITT.

Copies of this patent may be obtained for five cents each, by addressing the "Commissioner of Patents, Washington, D. C."